J. V. N. DORR.
AGITATOR.
APPLICATION FILED FEB. 25, 1913.
1,109,210.  Patented Sept. 1, 1914.
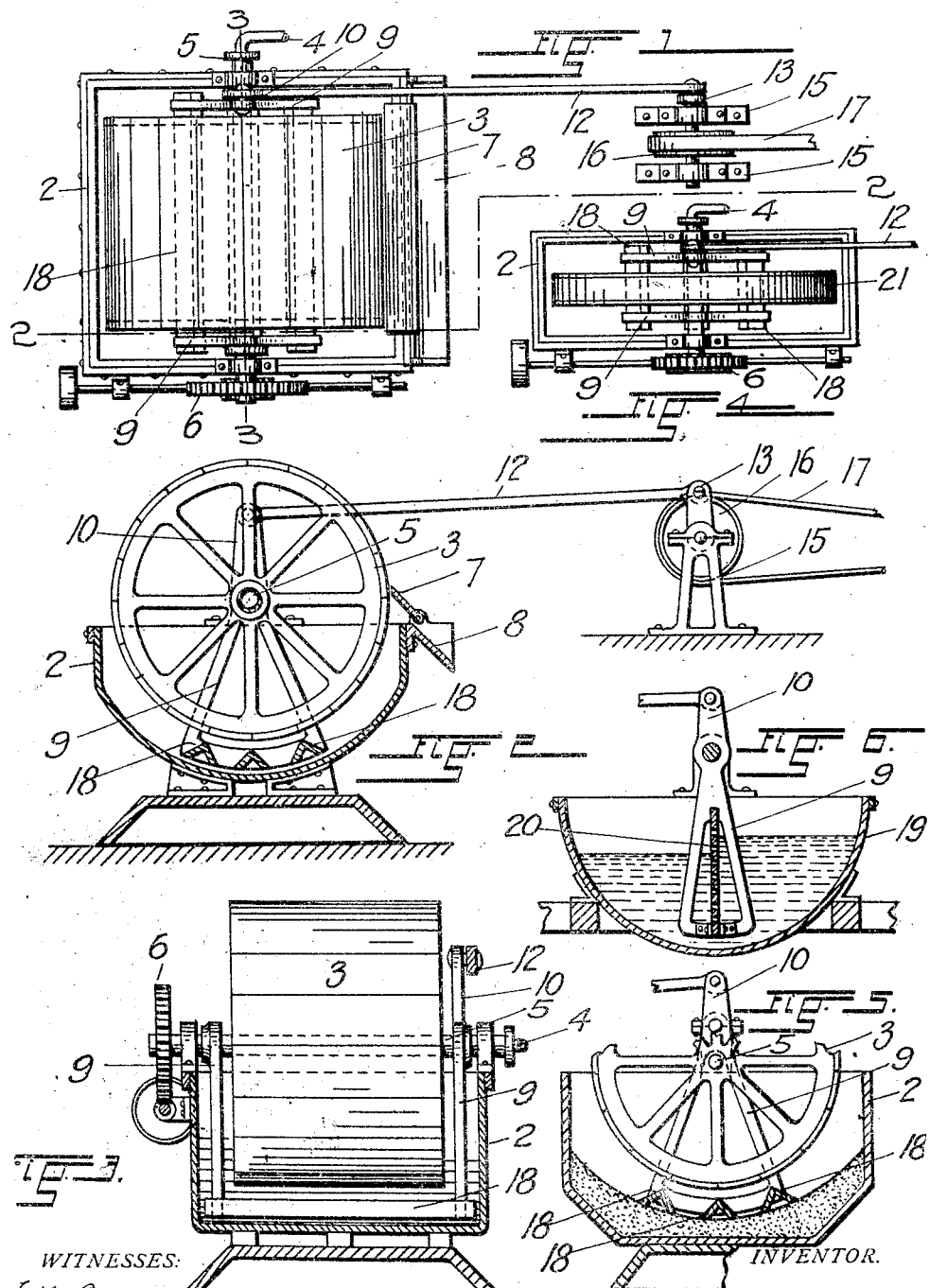
INVENTOR.
J. V. N. DORR

UNITED STATES PATENT OFFICE.

JOHN V. N. DORR, OF DENVER, COLORADO.

AGITATOR.

1,109,210.　　　　Specification of Letters Patent.　　Patented Sept. 1, 1914.

Application filed February 25, 1913. Serial No. 750,586.

*To all whom it may concern:*

Be it known that I, JOHN V. N. DORR, a citizen of the United States, residing at Denver, in the county of Denver and State of Colorado, have invented certain new and useful Improvements in Agitators, of which the following is a specification.

My invention relates to agitators for use in the treatment of metalliferous ores or other products which require filtration or thorough intermixture and its object resides in the provision of an apparatus of very simple construction, which by its operation in a tank or vat to which it is applied, will readily effect a thorough intermixture of solids and liquid in an aqueous mass contained therein, either for the purpose of maintaining these solid particles in suspension in the liquid or to dissolve the soluble constituents from the finely divided material in the course of a process of extraction.

While my invention may be effectively used wherever the agitation of a material under treatment is required in any of the processes employed for the extraction of the valuable constituents of comminuted ores, it is particularly adapted to be used in connection with machines of the type designed for the separation of the finely divided solids from liquid in which they are suspended, by filtration, such as, for example, the rotary vacuum filters which at present are extensively used for this purpose. In this connection, my agitator provides a much improved substitute for any one of the many devices which have been used for keeping the solids in suspension in the liquid contained in the vat in which the rotary filter has its movement, and which have been found deficient in many respects, especially when the solids to be filtered are of a sandy nature or contain a certain amount of sand or other coarse material.

Of the most commonly used methods designed to agitate the pulp in a filtering apparatus for the purpose of keeping its solids in suspension and thus eliminate the formation of obstructions to the movement of the rotary parts by building up the material in the tank, the air-lift, the use of a number of hoppers from which the pulp is withdrawn and returned to the tank by air-lifts outside the same, and the application of a centrifugal pump which through a reaction distributer effects a circulatory movement of the pulp by withdrawing it from the tank and returning it to the same, are representative. Aside from the fact that all these processes are costly in installation and operation, they all have the common objection that they do not prevent the material from building up outside the zone in which their action is effective and that for this reason, the movement of the rotary filter is sooner or later interfered with while it is difficult to obtain a uniform deposit on the filtering surface.

To effectively eliminate the above mentioned objections, it is necessary that the pulp contained in the filtering tank is evenly agitated along the entire bottom of the same, an object which is readily attained by the use of the present invention which, briefly consists of an element which has an oscillatory movement in suitable adjacency to the bottom of the tank to which it is applied and which includes in its construction either a series of bars which extend transversely with relation to the direction of its movement and are adapted to agitate the material contained in the tank and direct the solids toward the surface of the filtration medium associated therewith, or one or more perforated members which likewise extend transversely to the plane in which the oscillatory element has its movement and which more particularly adapt it for use as an agitator in tanks other than those employed for filtering purposes.

An agitator of this character requires but little power in its operation, is readily installed and may be maintained in an operative condition at a small expense, it will effectively maintain solids of the pulp in suspension along the entire bottom of the tank and insure a uniform deposit on the filtering surface. When employed in an ordinary agitating tank, it is well adapted to cause a thorough intermixture of the material in which it has its movement for the purpose of dissolving the soluble constituents from the finely divided matter, it may be effectively used in connection with an air lift, by which the heavier particles which settle out of the material are elevated to the surface to mix again with the slightly thinner pulp, and by its even motion and uniform effect on the pulp, it renders feasible the use of a rotary filter for dewatering concentrates and many other materials which require drying.

An embodiment of my invention has been illustrated in the accompanying drawings in the various views of which like parts are similarly designated and in which—

Figure 1 represents a plan view of a vacuum filtering apparatus, with my improved agitator in its operative position, Fig. 2, a section taken along the line 2—2 Fig. 1, Fig. 3, a transverse section along the line 3—3 Fig. 1, Fig. 4, a plan view of a rotary disk filter to which the agitator is applied, Fig. 5, a transverse section of a filter similar to those shown in Figs. 1 and 4, showing the method of operating the agitator in tanks whose interior surface is not concentric with the arc in which the agitator has its movement, and Fig. 6, a modification of my agitator when used in connection with an ordinary agitating tank.

Referring first to Figs. 1, 2 and 3 of the drawings, the numeral 2 designates a tank in which a cylindrical filtering element 3 is rotatably mounted in substantially concentric spaced relation to its arcuate bottom surface. The filtering element is as usual composed of a filter whose grooved and sectional peripheral wall is covered with a suitable filtering fabric and interiorly connected with a suction device by means of a conduit 4 applied to the hollow axle 5 of the same. The filter 3 receives its rotary motion from a conveniently located motor through the medium of a transmission mechanism, which in the drawings is designated by the numeral 6, and a scraper 7 is provided to remove the load of accumulated matter from its filtering surface into a launder 8.

My improved agitator used in connection with the filtering apparatus, consists of two rocker arms 9 which are rotatably mounted upon the shaft 5 of the cylinder 3 between the end surfaces of the latter and the respective end walls of the tank. One of the arms is extended to provide a crank arm 10, which through the medium of a pitman 12 is operatively connected with a crank arm 13 on a shaft 14 which is rotatably supported in bearings 15 and which by means of a pulley 16 and a belt 17, is connected with a motor, shaft or other driving medium.

The two arms 9, which are preferably of skeleton form, are connected at their lower ends by means of a series of bars 18 which extending parallel to the axis of the filter-cylinder, are arranged in an arc concentric with the interior bottom surface of the tank. The bars are made angular in cross section and disposed with their vertexes uppermost so that their sides converge inwardly from the ends of the arms to direct the material maintained in suspension by the oscillating movement of the agitator, toward the filtering surface of the filter 3.

When the tank in which the filtering element has its movement is interiorly of other than arcuate form, as in the construction shown in Fig. 5, or in case its interior surface is not concentric with the axis about which the agitator has its oscillating motion, the lower edges of the bars which are preferably arranged in an arc concentric with said axis, will cause the matter settling out of the pulp onto the bottom of the tank to assume an arcuate form, and thus provide a surface which for all purposes becomes the interior surface of the tank along which the bars move to maintain the other solids contained in the material under treatment continually in suspension until they are deposited on the surface of the rotating cylinder.

In the construction shown in Fig. 5, the axis about which the agitator has its oscillatory movement is disposed above the axis of rotation of the cylindrical filter for the purpose of preventing the fluid or solids of the material under treatment from reaching the bearings of the agitator, in case the axis of the filtering member is disposed below or adjacent to the level of the fluid in the tank.

In the modification shown in Fig. 6, the oscillating agitator is mounted in a semicircular tank 19, and its arms are connected by a perforated plate 20 which extends in spaced relation to the end and bottom surfaces of the tank and which during the oscillating movement of the device, will cause the fluid in front of it to rise to a higher level and force the solid particles of the pulp around its edges and through its perforations with a vigorous scouring motion.

In the form shown in Fig. 4, the agitator is applied to a filtering apparatus in which the rotary element consists of a disk 21 into which the value-carrying liquid is admitted through filtering mediums applied to its vertical sides, by shortening the length of the agitating members 18, and I desire it understood that by similar or other variations in the construction or arrangement of the parts of which the agitating device is composed, it may be successfully applied to filtering apparatus or agitating tanks other than those illustrated in the drawings, without departing from the spirit of the invention as expressed in the following claims.

I claim—

1. The combination with a tank and an element having a rotary movement in spaced relation to an interior surface thereof, of an element having a reciprocating movement in said space.

2. The combination with a tank and a substantially cylindrical element having a rotary movement in spaced relation to an interior surface thereof, of an element having an oscillatory movement in said space.

3. The combination with a tank and a substantially cylindrical element having a rotary movement in spaced relation to an interior surface thereof, of an element having an oscillatory movement in said space about the axis of rotation of the first-mentioned element.

4. The combination with a tank having a curved surface and an element having a rotary movement in spaced relation to said surface, of an element having an oscillating movement in said space in an arc substantially concentric with said surface.

5. The combination with a tank and an element having a rotary movement in spaced relation to an interior surface thereof, of a series of bars extending longitudinally in the said space, and means for imparting a transverse reciprocating movement to said series.

6. The combination with a tank and an element having a rotary movement in spaced relation to an interior surface thereof, of a bar of angular section having a transverse reciprocating movement in said space, its sides converging toward said element.

7. The combination with a tank and a substantially cylindrical element having a rotary movement in spaced relation to an interior surface thereof, of a bar of angular section, disposed longitudinally in said space with its sides converging toward said element, and means for imparting a transverse movement to said bar.

8. The combination with a tank and a substantially cylindrical element having a rotary movement in spaced relation to an interior surface thereof, of a series of bars of angular section, disposed longitudinally in said space, with their sides converging toward said element, and means for imparting a transverse movement to said series.

9. The combination with a tank and an element having a rotary movement in spaced relation to an interior surface thereof, of a pair of arms mounted to oscillate about a common axis, means for imparting an oscillating movement to said arms, and an agitating appliance in said space connecting the ends of said arms.

10. The combination with a tank and an element having a rotary movement in spaced relation to an interior surface thereof, of a pair of arms mounted to oscillate about a common axis, means for imparting an oscillating movement to said arms, and bars in said space, connecting the ends of said arms.

11. The combination with a tank and an element having a movement in spaced relation to an interior surface thereof, of a bar of angular section having a transverse movement in said space, the sides of said bar converging toward said element.

12. The combination with a tank and an element having a movement in spaced relation to an interior surface thereof, of an agitating element having a reciprocating movement in said space.

In testimony whereof I have affixed my signature in presence of two witnesses.

JOHN V. N. DORR.

Witnesses:
ADELINE BARTLETT,
G. J. ROLLANDET.